US012750280B2

(12) United States Patent
Rajput et al.

(10) Patent No.: US 12,750,280 B2
(45) Date of Patent: Sep. 29, 2026

(54) METHODS, SYSTEMS, AND COMPUTER READABLE MEDIA FOR NETWORK ANALYTICS DATA DIRECTOR (NADD)-ASSISTED DYNAMIC CONFIGURATION OF HYPERTEXT TRANSFER PROTOCOL (HTTP) PARAMETER SETTINGS AT NETWORK FUNCTIONS (NFs)

(71) Applicant: Oracle International Corporation, Redwood Shores, CA (US)

(72) Inventors: Jay Rajput, Bangalore (IN); Ashish Kumar, Gurgaon (IN); Virendra Singh, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 18/906,210

(22) Filed: Oct. 4, 2024

(65) Prior Publication Data

US 2026/0100883 A1 Apr. 9, 2026

(51) Int. Cl.

*H04L 41/14* (2022.01)
*H04L 47/19* (2022.01)
*H04L 67/02* (2022.01)

(52) U.S. Cl.

CPC .............. *H04L 41/14* (2013.01); *H04L 47/19* (2013.01); *H04L 67/02* (2013.01)

(58) Field of Classification Search

None

See application file for complete search history.

(56) References Cited

U.S. PATENT DOCUMENTS

2022/0286518 A1* 9/2022 Rajput .................... H04L 67/02
2022/0386225 A1* 12/2022 Sapra ...................... H04L 67/51

(Continued)

FOREIGN PATENT DOCUMENTS

GB 2643276 A * 2/2026 ........ H04W 28/0284
WO WO 2022197533 A1 9/2022
WO WO-2025052166 A1 * 3/2025 ............ H04W 12/12

OTHER PUBLICATIONS

3rd Generation Partnership Project; Technical Specification Group Core Network and Terminals; 5G System; Network Function Repository Services; Stage 3 (Release 18) 3GPP TS 29.510 V18.7.0 (Jun. 2024).

(Continued)

*Primary Examiner* — Chris Parry
*Assistant Examiner* — Abderrahmen Chouat
(74) *Attorney, Agent, or Firm* — Jenkins, Taylor & Hunt, P.A.

(57) ABSTRACT

A method for NADD-assisted dynamic configuration of HTTP parameter settings at NFs includes receiving, at the NADD, SBI message feeds from a plurality of producer NFs. The method further includes determining, by the NADD and from at least one of the SBI message feeds, an HTTP parameter setting for one of the producer NFs. The method further includes communicating, by the NADD, the HTTP parameter setting to the producer NF. The method further includes receiving, by the producer NF and from the NADD, the HTTP parameter setting. The method further includes using, by the producer NF, the HTTP parameter setting to control traffic flow from a consumer NF to the producer NF.

20 Claims, 8 Drawing Sheets

(56) References Cited

U.S. PATENT DOCUMENTS

2022/0394453 A1* 12/2022 Goel ........................ H04L 67/52
2026/0039546 A1* 2/2026 Shirke ................. H04L 41/0816

OTHER PUBLICATIONS

3rd Generation Partnership Project; Technical Specification Group Core Network and Terminals; 5G System; Principles and Guidelines for Services Definition; Stage 3 (Release 18) 3GPP TS 29.501 V18.5.0 (Jun. 2024.

3rd Generation Partnership Project; Technical Specification Group Core Network and Terminals; 5G System; Technical Realization of Service Based Architecture; Stage 3 (Release 18) 3GPP TS 29.500 V18.6.0 (Jun. 2024).

3rd Generation Partnership Project; Technical Specification Group Services and System Aspects; Procedures for the 5G System (5GS); Stage 2 (Release 18) 3GPP TS 23.502 V18.6.0 (Jun. 2024).

3rd Generation Partnership Project; Technical Specification Group Services and System Aspects; System architecture for the 5G System (5GS); Stage 2 (Release 19) 3GPP TS 23.501 V19.0.0 (Jun. 2024).

Thomson, et al., "HTTP/2", rfc 9113, Internet Engineering Task Force (IETF), pp. 1-78 (Jun. 2022).

Orange: "HTTP2 connection flow control usage", 3GPP Draft, C4-184243, (May 11, 2018).

3rd Generation Partnership Project (3GPP): "5G System; Technical Realization of Service Based Architecture; Stage 3 (Release 19)", Technical Specification, 3GPP TS 29.500 V19.0.0, (Sep. 19, 2024).

Notification of Transmittal of the International Search Report and the Written Opinion of the International Searching Authority, or Declaration for International Application Serial No. PCT/US2025/043563 (Jan. 12, 2026).

* cited by examiner

METHODS, SYSTEMS, AND COMPUTER READABLE MEDIA FOR NETWORK ANALYTICS DATA DIRECTOR (NADD)-ASSISTED DYNAMIC CONFIGURATION OF HYPERTEXT TRANSFER PROTOCOL (HTTP) PARAMETER SETTINGS AT NETWORK FUNCTIONS (NFs)

TECHNICAL FIELD

The subject matter described herein relates to configuring HTTP parameter settings. More particularly, the subject matter described herein relates to methods, systems, and computer readable media for NADD-assisted dynamic configuration of HTTP connection parameter settings at NFs.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms “producer NF” and “NF service producer” are used interchangeably herein. Similarly, the terms “consumer NF” and “NF service consumer” are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One issue that can arise in 5G, previous generation, and subsequent generation networks that use hypertext transfer protocol (HTTP) is that statically configured or misconfigured HTTP settings can result in degraded network performance. As used herein, the terms “HTTP setting” and “HTTP parameter setting” refer to a value of an HTTP parameter that is used to control communication between HTTP endpoints. For example, the 5G service based-interface (SBI) uses HTTP version 2 (HTTP/2). Statically configured HTTP/2 settings, such as the HTTP/2 connection window size at an HTTP receiver, can cause an HTTP sender to implement flow control for traffic to the HTTP receiver when the HTTP receiver has available capacity to process the traffic. HTTP senders and receivers exchange HTTP settings during HTTP connection initialization and after initialization using WINDOW_UPDATE messages. Some HTTP connection parameter settings, such as the connection window size parameter setting, can be based on static configurations at HTTP receivers. An HTTP sender tracks the amount of data it can send to the receiver and will implement flow control, i.e., stop sending data to the receiver, if the amount of data to be sent over a connection would exceed the connection window size. The HTTP receiver updates its connection window size with the sender by sending WINDOW_UPDATE messages to the HTTP sender. However, how the HTTP receiver sets the connection window size and other HTTP parameters is not standardized.

Accordingly, in light of these and other difficulties, there exists a need for improved methods, systems, and computer readable media for configuring and communicating HTTP settings at a network function.

SUMMARY

A method for NADD-assisted dynamic configuration of HTTP parameter settings at NFs includes receiving, at the NADD, SBI message feeds from a plurality of producer NFs. The method further includes determining, by the NADD and from at least one of the SBI message feeds, an HTTP parameter setting for one of the producer NFs. The method further includes communicating, by the NADD, the HTTP parameter setting to the producer NF. The method further includes receiving, by the producer NF and from the NADD, the HTTP parameter setting. The method further includes using, by the producer NF, the HTTP parameter setting to control traffic flow from a consumer NF to the producer NF.

According to another aspect of the subject matter described herein, receiving the SBI message feeds includes receiving copies of SBI messages transmitted and received by the producer NF.

According to another aspect of the subject matter described herein, the HTTP parameter setting comprises an HTTP connection window size value.

According to another aspect of the subject matter described herein, determining the HTTP parameter setting includes determining the HTTP connection window size value based on an analysis of traffic received by the producer NF from the consumer NF to reduce a likelihood of the consumer NF going into flow control.

According to another aspect of the subject matter described herein, the method for NADD-assisted dynamic configuration of HTTP parameter settings at NFs includes receiving, at the NADD and from the producer NF, an HTTP parameter setting subscription request message.

According to another aspect of the subject matter described herein, communicating the HTTP parameter setting to the producer NF includes transmitting the HTTP parameter setting to the producer NF in an HTTP parameter setting subscription response message responsive to the HTTP parameter setting subscription request message.

According to another aspect of the subject matter described herein, communicating the HTTP parameter setting to the producer NF includes communicating the HTTP parameter setting to the producer NF in a response message transmitted to the producer NF in response to a query message received from the producer NF.

According to another aspect of the subject matter described herein, the method for NADD-assisted dynamic configuration of HTTP parameter settings at NFs includes continually and automatically updating, by the NADD and based on the at least one of the SBI message feeds, the HTTP parameter setting.

According to another aspect of the subject matter described herein, using the HTTP parameter setting to control traffic flow from the consumer NF to the producer NF includes communicating the HTTP parameter setting to the consumer NF, and, at the consumer NF, using the HTTP parameter setting to control the traffic flow from the consumer NF to the producer NF.

According to another aspect of the subject matter described herein, the HTTP parameter setting includes one or more of an HTTP maximum concurrent streams value and an HTTP stream window size value.

According to another aspect of the subject matter described herein, a system for network analytics data director (NADD)-assisted dynamic configuration of hypertext transfer protocol (HTTP) parameter settings at network functions (NFs) is provided. The system includes a producer NF including at least one processor and a memory. The system further includes a NADD including at least one processor and a memory for receiving service-based interface (SBI) message feeds from a plurality of producer NFs, including the producer NF, determining, from at least one of the SBI message feeds, an HTTP parameter setting for the producer NF, and communicating the HTTP parameter setting to the producer NF. The producer NF is configured to receive the HTTP parameter setting from the NADD and use the HTTP parameter setting to control traffic flow from a consumer NF to the producer NF.

According to another aspect of the subject matter described herein, the SBI message feeds include copies of SBI messages transmitted and received by the producer NF.

According to another aspect of the subject matter described herein, the NADD is configured to determine the HTTP parameter setting by determining the HTTP connection window size value based on an analysis of traffic received by the producer NF from the consumer NF to reduce a likelihood of the consumer NF going into flow control.

According to another aspect of the subject matter described herein, the NADD is configured to receive, from the producer NF, an HTTP parameter setting subscription request message and to communicate the HTTP parameter setting to the producer NF by transmitting the HTTP parameter setting to the producer NF in an HTTP parameter setting subscription response message responsive to the HTTP parameter setting subscription request message.

According to another aspect of the subject matter described herein, the NADD is configured to communicate the HTTP parameter setting to the producer NF by transmitting a response message to the producer NF in response to a query message received from the producer NF.

According to another aspect of the subject matter described herein, the NADD is configured to continually and automatically update the HTTP parameter setting based on the at least one of the SBI message feeds.

According to another aspect of the subject matter described herein, the producer NF is configured to use the HTTP parameter setting to control traffic flow from the consumer NF to the producer NF by communicating the HTTP parameter setting to the consumer NF.

According to another aspect of the subject matter described herein, one or more non-transitory computer readable medium having stored thereon executable instructions that when executed by one or more processors of one or more computers control the one or more computers to perform steps is provided. The steps include receiving, at a network analytics data director (NADD), service-based interface (SBI) message feeds from a plurality of producer network functions (NFs). The steps further include determining, by the NADD and from at least one of the SBI message feeds, an HTTP parameter setting for one of the producer NFs. The steps further include communicating, by the NADD, the HTTP parameter setting to the producer NF. The steps further include receiving, by the producer NF and from the NADD, the HTTP parameter setting. The steps further include using, by the producer NF, the HTTP parameter setting to control traffic flow from a consumer NF to the producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
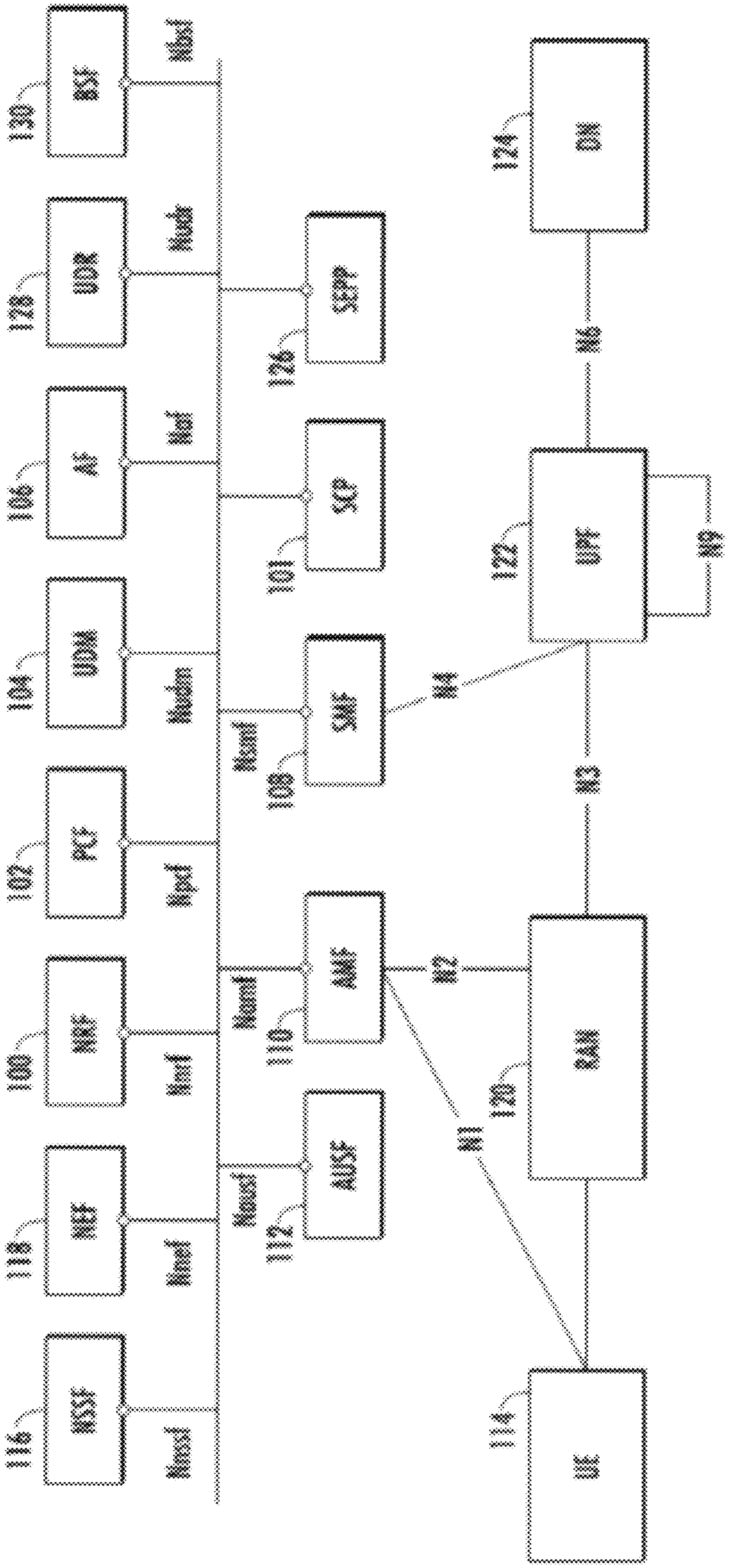
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one issue in 5G, previous generation, and subsequent generation networks is that static configuration of HTTP parameter values can result in sub-optimal network performance. The current 5G SBI interface uses HTTP/2. Different aspects of HTTP/2 need to be fine-tuned as per network function deployments and use cases. Some 5G NFs provide include a configuration interface for configuring different aspects of HTTP/2. Guidance for this configuration can be provided by network equipment manufacturers to customers based on limited knowledge of customer deployments and use cases. These configurations are manual, pre-configured, and static (i.e., not dynamically adjustable based on the traffic). Misconfiguration of different aspects of HTTP/2 settings can hinder the optimal transmission of data, resulting in degraded performance, increased latency, and potentially disruption of 5G SBI traffic. Addressing the misconfiguration issue requires identifying and rectifying the misconfigured parameters to ensure smooth and efficient communication between NF service consumers and NF service producers.

The subject matter described herein includes dynamic configuration of HTTP settings at NFs using NADD-provided analysis to mitigate problems seen with the misconfiguration. The NFs will update these configurations (where possible) dynamically during runtime based on the latest settings provided by the NADD.

In HTTP/2, connection establishment begins with the client sending a SETTINGS frame immediately after establishing a transmission control protocol (TCP) connection with the server. The SETTINGS frame contains various parameters that the client suggests for the configuration of the HTTP/2 connection. These parameters may include settings, such as initial window size, stream window size, maximum concurrent streams, and others, which impact the behaviour of the HTTP/2 connection. Once the server receives the SETTINGS frame, the server can respond with its own SETTINGS frame, acknowledging the client's settings and potentially providing the server's own preferences. This exchange helps both client and server negotiate the parameters for the HTTP/2 connection before proceeding with further communication. It is important to note that the connection level window size is controlled by WINDOW_UPDATE frame and not by any setting.

Figure 2:
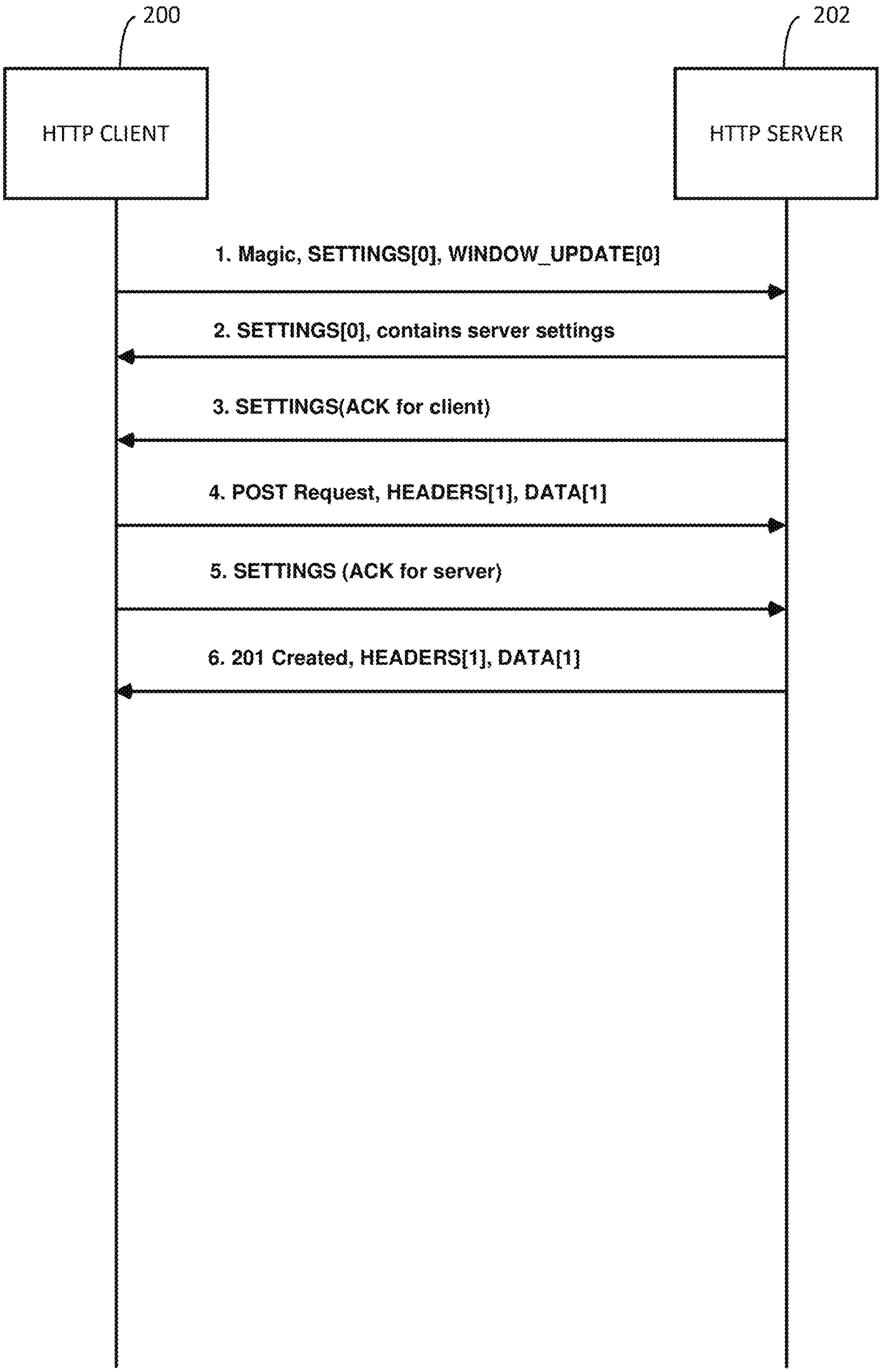
FIG. 2 is a message flow diagram illustrating HTTP/2 connection establishment and the exchange of HTTP/2 parameter settings.

FIG. 2 is a message flow diagram illustrating HTTP/2 connection establishment and the exchange of HTTP/2 parameter values. Referring to FIG. 2, in step 1, and HTTP client 200 sends a SETTNGS frame and a WINDOW_UPDATE frame to an HTTP server 202. The HTTP SETTINGS fame can include the client's preferred parameter settings, which may include settings, i.e., parameter values of one or more of the following parameters:

SETTINGS_HEADER_TABLE_SIZE (0x01):
SETTINGS_ENABLE_PUSH (0x02):
SETTINGS_MAX_CONCURRENT_STREAMS (0x03):
SETTINGS_INITIAL_WINDOW_SIZE (0x04):
SETTINGS_MAX_FRAME_SIZE (0x05):
SETTINGS_MAX_HEADER_LIST_SIZE (0x06):

In step 2, HTTP server 202 sends a SETTINGS frame to HTTP client 200. The SETTINGS frame from HTTP server 202 includes the server's initial settings. In step 3, HTTP server 202 sends a SETTINGS acknowledgement frame to HTTP client 200. In step 4, HTTP client 200 sends an HTTP POST request to HTTP server 202. In step 5, HTTP client 200 sends a SETTINGS acknowledgement frame to HTTP server 202. In step 6, HTTP server 202 sends a 201 Created message to HTTP client 200.

Using streams for multiplexing introduces contention over use of the TCP connection, resulting in blocked streams. A flow control scheme ensures that streams on the same connection do not destructively interfere with each other. Flow control is used for both individual streams and the connection as a whole.

HTTP/2 provides for flow control through use of the WINDOW_UPDATE frame (IETF RFC 9113, Section 6.9).

Section 5.2.1 defines flow control principles as follows: HTTP/2 stream flow control aims to allow a variety of flow-control algorithms to be used without requiring protocol changes. Flow control in HTTP/2 has the following characteristics:

1. Flow control is specific to a connection. HTTP/2 flow control operates between the endpoints of a single hop and not over the entire end-to-end path.
2. Flow control is based on WINDOW_UPDATE frames. Receivers advertis5e how many octets they are prepared to receive on a stream and for the entire connection. This is a credit-based scheme.
3. Flow control is directional with overall control provided by the receiver. A receiver MAY choose to set any window size that it desires for each stream and for the entire connection. A sender MUST respect flow-control limits imposed by a receiver. Clients, servers, and intermediaries all independently advertise their flow-control window as a receiver and abide by the flow-control limits set by their peer when sending.
4. The initial value for the flow-control window is 65,535 octets for both new streams and the overall connection.
5. The frame type determines whether flow control applies to a frame. Of the frames specified in this document, only DATA frames are subject to flow control; all other frame types do not consume space in the advertised flow-control window. This ensures that important control frames are not blocked by flow control.
6. An endpoint can choose to disable its own flow control, but an endpoint cannot ignore flow-control signals from its peer.
7. HTTP/2 defines only the format and semantics of the WINDOW_UPDATE frame (Section 6.9). This document does not stipulate how a receiver decides when to send this frame or the value that it sends, nor does it specify how a sender chooses to send packets.

Implementations are able to select any flow control algorithm that suits their needs. Implementations are also responsible for prioritizing the sending of requests and responses, choosing how to avoid head-of-line blocking for requests, and managing the creation of new streams. Algorithm choices for these could interact with any flow-control algorithm. The point to highlight is that the frequency of sending WINDOW_UPDATE messages is implementation dependent. Receivers try to optimize the number of WINDOW_UPDATE frames by sending WINDOW_UPDATE frames to a sender only when the sender has consumed 50% of the advertised connection window size. One such example of this implementation is Undertow, which is an open source HTTP implementation that sends WINDOW_UPDATE frames when 50% of the available capacity in a connection window or a stream window is used.

Figure 3:
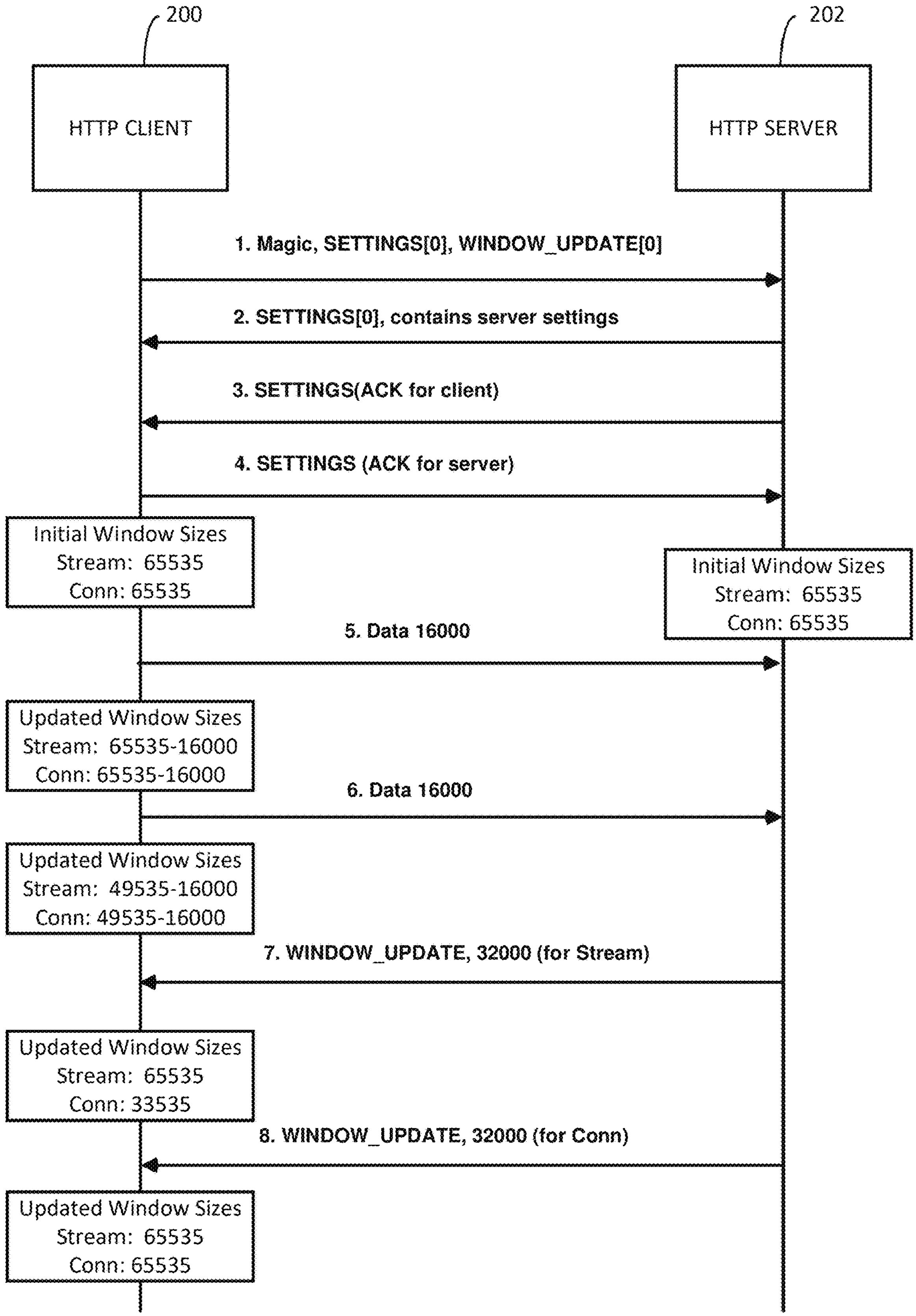
FIG. 3 is a message flow diagram illustrating HTTP/2 flow control.

FIG. 3 is a message flow diagram illustrating HTTP/2 flow control. The example diagram shows WINDOW_UPDATE being sent at 50% rather than after reading each DATA frame. Referring to the message flow in FIG. 3, in steps 1-4, HTTP client 200 and HTTP server 202 establish an HTTP connection. After step 4, the initial stream window size is 65535 bytes, and the initial connection window size is also 65535 bytes.

In step 5, HTTP client 200 sends 16000 bytes of data to HTTP server 202. The sending of 16000 bytes of data consumes about ¼ of the available amount of data that can be sent in the connection window and the stream window. In step 6, HTTP client 200 sends another 16000 bytes of data to HTTP server 202. The sending of the 16000 bytes of data consumes another ¼ of the amount of data that can be sent in the connection window and the stream window. In step 7, HTTP server 202 sends a WINDOW_UPDATE frame increasing the stream window size by 32000 bytes. In step 8, HTTP server 202 sends a WINDOW_UPDATE frame increasing the connection window size by 32000 bytes.

HTTP/2 allows configuration of the window size for both connections and streams. Stream window size can be configured using HTTP/2 setting SETTINGS_INITIAL_WINDOW_SIZE (0x04). There is no setting for connection window size, which means that the initial value for the connection window size is implementation-specific. The WINDOW_UPDATE frame can be used to update both stream and connection level window size.

If the connection window size of the stream window size on an HTTP server is too small, i.e., smaller than the available capacity of the server, the following issues can occur:

1. Congestion and Slow Data Transfer: A small window size means the client can only send a limited amount of data before waiting for acknowledgment from the server. This can lead to congestion as the client may be required to frequently pause transmission, resulting in slower data transfer rates.
2. Increased Latency: With a small window size, the client may need to wait longer for acknowledgments from the server before sending additional data. This increased wait time can contribute to higher latency in the communication between the client and server.
3. Resource Starvation: A connection window size that is too small may cause resource starvation for other streams that share the connection. A single stream may consume all of the connection window size.

4. Potential Deadlocks: In extreme cases, a small connection window size combined with slow acknowledgment from the server could lead to deadlock situations, where both client and server are waiting for each other to release resources before proceeding with the communication.

Overall, a small window size set on the server in HTTP/2 can significantly impair the performance and efficiency of the communication between the client and server, resulting in slower data transfer rates, increased latency, and potential resource starvation issues.

An HTTP sender receives a WINDOW_UPDATE message when the HTTP receiver has freed up buffer space, and the HTTP receiver wants to inform the sender that it can accept more data. This happens dynamically during the data transfer process.

An HTTP window size that is too large can also cause the following issues:

1. Congestion Control: The initial window size determines how much data can be sent before receiving an acknowledgment. A very high value can overwhelm the network, causing congestion and potentially leading to packet loss. Congestion control mechanisms, such as TCP congestion control, are designed to prevent packet loss by dynamically adjusting the window size based on network conditions.
2. Buffer Overflow: A very high initial window size can also lead to buffer overflow at the receiving end, especially if the receiver cannot handle the data at that rate. This can result in dropped packets or data loss.
3. Fairness: HTTP operates over TCP, which shares network resources fairly with other TCP connections. Setting an excessively high initial window size for an HTTP connection can be seen as unfair because the HTTP connection can hog a disproportionate share of the available bandwidth, impacting the performance of other connections on the network.
4. Latency: While a larger initial window size can potentially improve throughput by reducing the number of round trips needed to transmit data, it can also increase latency, especially if there are packet losses and retransmissions due to network congestion.

Overall, while it might seem advantageous to set a very high initial window size for HTTP connections to maximize throughput, it is important to balance this with considerations of network congestion, fairness, buffer management, and latency. TCP's congestion control mechanisms are designed to dynamically adjust the window size to optimize throughput while maintaining network stability and fairness. However, an HTTP sender sharing a TCP connection with other senders may over-or under-utilize a TCP congestion window if the HTTP connection window size is not properly set and managed.

The HTTP/2 RFC (i.e., IETF RFC 9113) does not define the behavior of sending out of WINDOW_UPDATE frame by the receiver. Receivers try to optimize the number of WINDOW_UPDATE frames by sending the WINDOW_UPDATE frame only when a sender has consumed 50% of the advertised connection window. One such example of this implementation is the above-described open source Undertow HTTP implementation. The misconfiguration of HTTP/2 settings can impact specific (and not all) traffic flows, making them difficult to debug. HTTP settings misconfiguration can cause network failures and can result in unnecessary terminations of SBI transactions.

Figure 4:
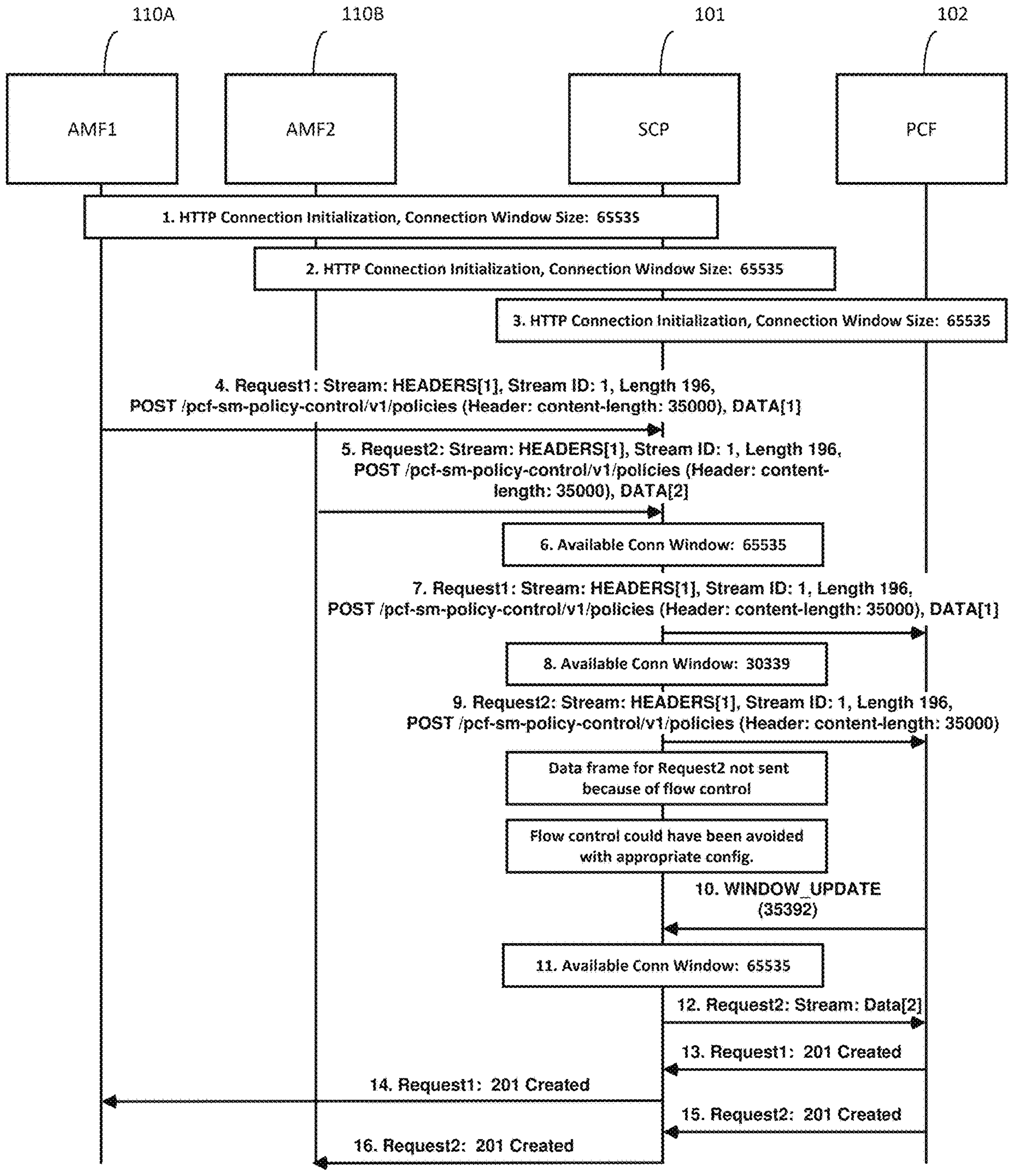
FIG. 4 is a message flow diagram illustrating a problem that can occur when HTTP parameter settings are statically configured.

FIG. 4 is a message flow diagram illustrating a problem that can occur when HTTP parameter values are statically configured. Referring to FIG. 4, in step 1, AMF 110A establishes an HTTP connection with SCP 101. The initial window size for the HTTP connection is 65535 bytes. In step 2, AMF 110B establishes an HTTP connection with SCP 101. The initial window size for the HTTP connection is 65535 bytes. In step 3, SCP 101 establishes an HTTP connection with PCF 102. The initial window size for the HTTP connection is 65535 bytes.

In step 4, AMF 110A sends an SBI request including headers and 35000 bytes of data to SCP 101. In step 5, AMF 110B sends an SBI request including headers and a data frame including 35000 bytes of data to SCP 101. In step 6, SCP 101 determines the available HTTP connection window size for the HTTP connection with PCF 102 to be 65535 bytes. In step 7, SCP 101 forwards the SBI request including the headers and the data frame with 35000 bytes of data to PCF 102. In step 8, SCP 101 determines that the amount of available data that can be sent within the connection window for the HTTP connection with PCF 102 is 30339 bytes. Because the request from AMF 110B includes a data frame with 35000 bytes of data, in step 9, SCP 101 implements flow control and sends the headers only of the request from AMF 110B with no data frame. The flow control in step 9 could have been avoided with appropriate HTTP connection window size configuration and management.

In step 10, PCF 102 sends a WINDOW_UPDATE frame to SCP 101 to increase the HTTP connection window size by 35392 bytes. SCP 101 receives the WINDOW_UPDATE frame, and, in step 11 increases the HTTP connection window size to 65535 bytes. In step 12, SCP 101 forwards the data frame from AMF 110B with 35000 bytes of data to PCF 102. In step 13, PCF 102 responds to the request in step 7 with a 201 Created message. In step 14, SCP 101 forwards the 201 Created message to AMF 110A. In step 15, PCF 102 responds to the request in step 12 with a 201 Created message. In step 16, SCP 101 forwards the 201 Created message from step 14 to AMF 110B.

Figure 5:
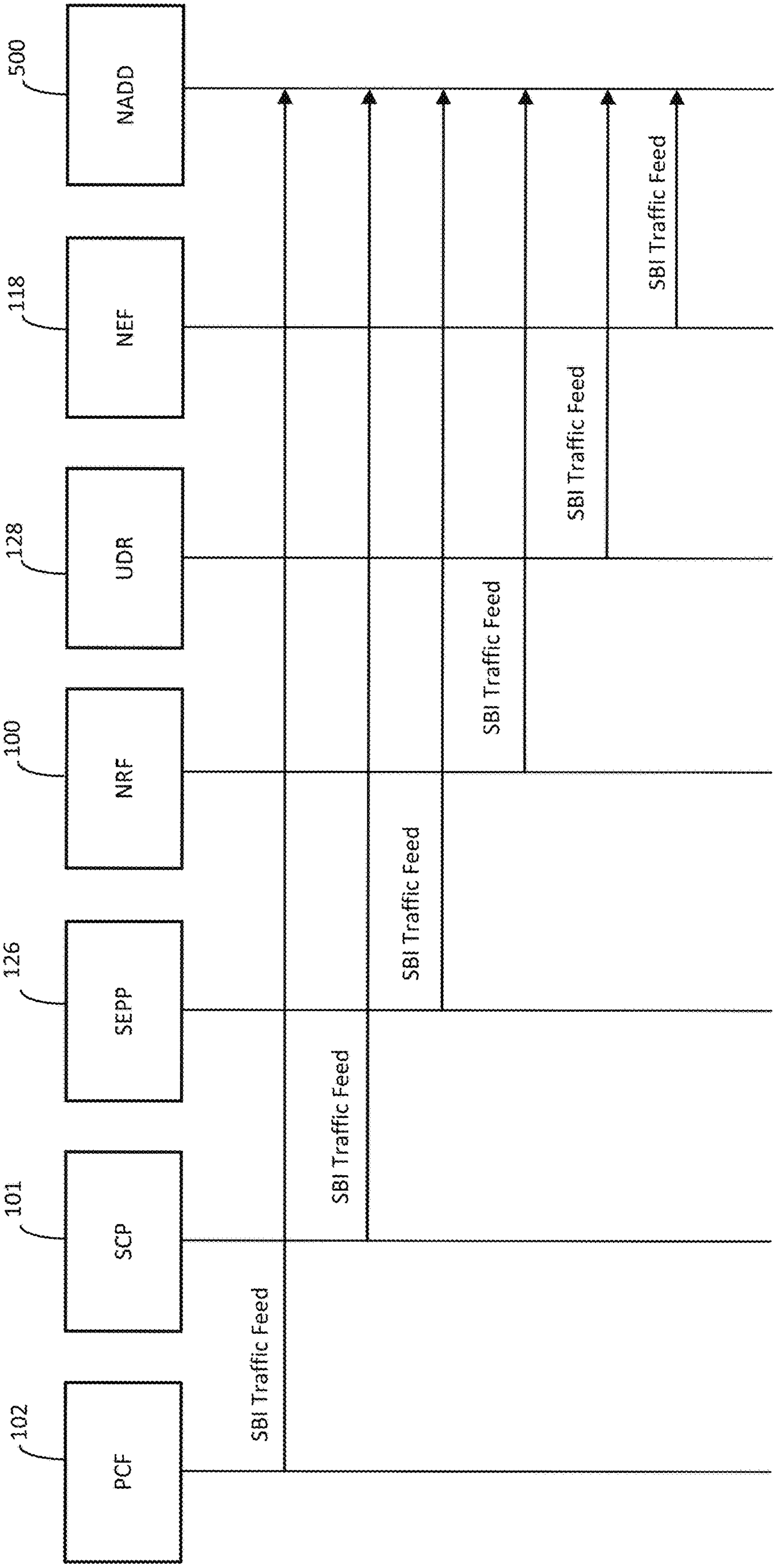
FIG. 5 is a message flow diagram illustrating the providing of SBI message feeds to a NADD.

To reduce the likelihood of unnecessary flow control and other undesirable effects of HTTP parameter setting mismanagement, the subject matter described herein utilizes information available from a NADD to inform the configuration and management of HTTP parameter settings, such as connection window size settings. FIG. 5 is a message flow diagram illustrating the providing of SBI message feeds to a NADD. In FIG. 5, each of PCF 102, SCP 101, SEPP 126, NRF 100, UDR 128, and NEF 118 provides an SBI traffic feed to NADD 500. Each traffic feed may include copies of SBI messages transmitted and received by each of the illustrated NFs. NADD 500 receives the copies of the SBI messages, calculates HTTP parameter values, and distributes the HTTP parameter values to NFs. The NFs receive the HTTP parameter values calculated by the NADD and use the parameter values to set HTTP parameter values for HTTP connections with other NFs.

Figure 6:
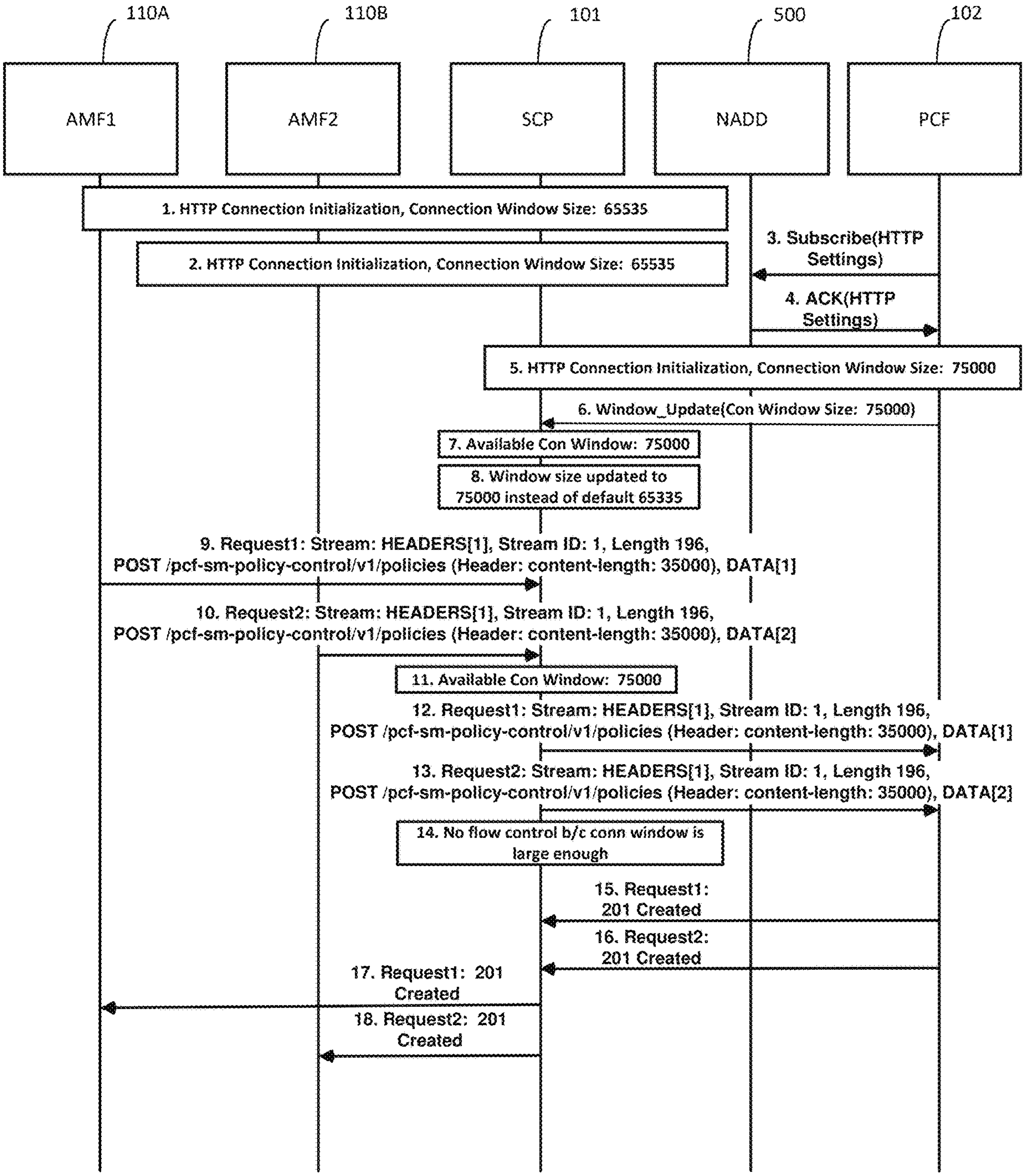
FIG. 6 is a message flow diagram illustrating NADD-assisted dynamic configuration of HTTP parameter settings at NFs.

FIG. 6 is a message flow diagram illustrating NADD-assisted dynamic configuration of HTTP parameter settings. Referring to FIG. 6, in step 1, AMF 110A establishes an HTTP connection with SCP 101. The HTTP connection window size for data transmitted to SCP 101 over the connection is 65535 bytes. In step 2, AMF 110B establishes an HTTP connection with SCP 101. The HTTP connection window size for data transmitted to SCP 101 over the connection is 65535 bytes.

In steps 3 and 4, PCF 102 requests and obtains HTTP connection level parameter settings from NADD 500. In the illustrated example, PCF 102 obtains the settings by transmitting a HTTP settings subscribe request message to NADD 500. Sending an HTTP settings subscribe message causes NADD 500 to create a subscription for HTTP settings for the subscribing NF. According to the subscription, NADD 500 may calculate and periodically update the subscribing NF with HTTP parameter settings for the connection. In an alternate implementation, an NF may request HTTP parameter settings from NADD 500 on an as-needed basis, and NADD 500 may provide the HTTP connection parameter settings in response to the requests.

In FIG. 6, NADD calculates the connection window size to 75000 bytes. NADD 500 may calculate the HTTP connection window size based historical traffic needs of SCP 101 when transmitting data to PCF 102. In steps 7 and 8, SCP 101 reads the connection window size received from NADD 500 and sets the HTTP connection window size for the connection with PCF 102 to 75000 bytes.

In step 9, AMF 110A sends 35000 bytes of data to SCP 101. In step 10, AMF 110B sends 35000 bytes of data to SCP 101. In step 11, SCP 101 determines the available HTTP connection window size for the HTTP connection with PCF 102 is 75000 bytes. In step 12, SCP 101 forwards 35000 bytes of data with headers from AMF 110A to PCF 102. In steps 13 and 14, rather than implementing flow control, SCP 101 forwards 35000 bytes of data with headers from AMF 110B to PCF 102.

In step 15, PCF 102 responds to the request in step 12 with a 201 Created message. In step 16, PCF 102 responds to the request in step 13 with a 201 Created message. In step 17, SCP 101 forwards the 201 Created message from step 15 to AMF 110A. In step 18, SCP 101 forwards the 201 Created message from step 16 to AMF 110B. Thus, using NADD-created data, HTTP parameter mismanagement and the associated undesirable network effects can be avoided.

Figure 7:
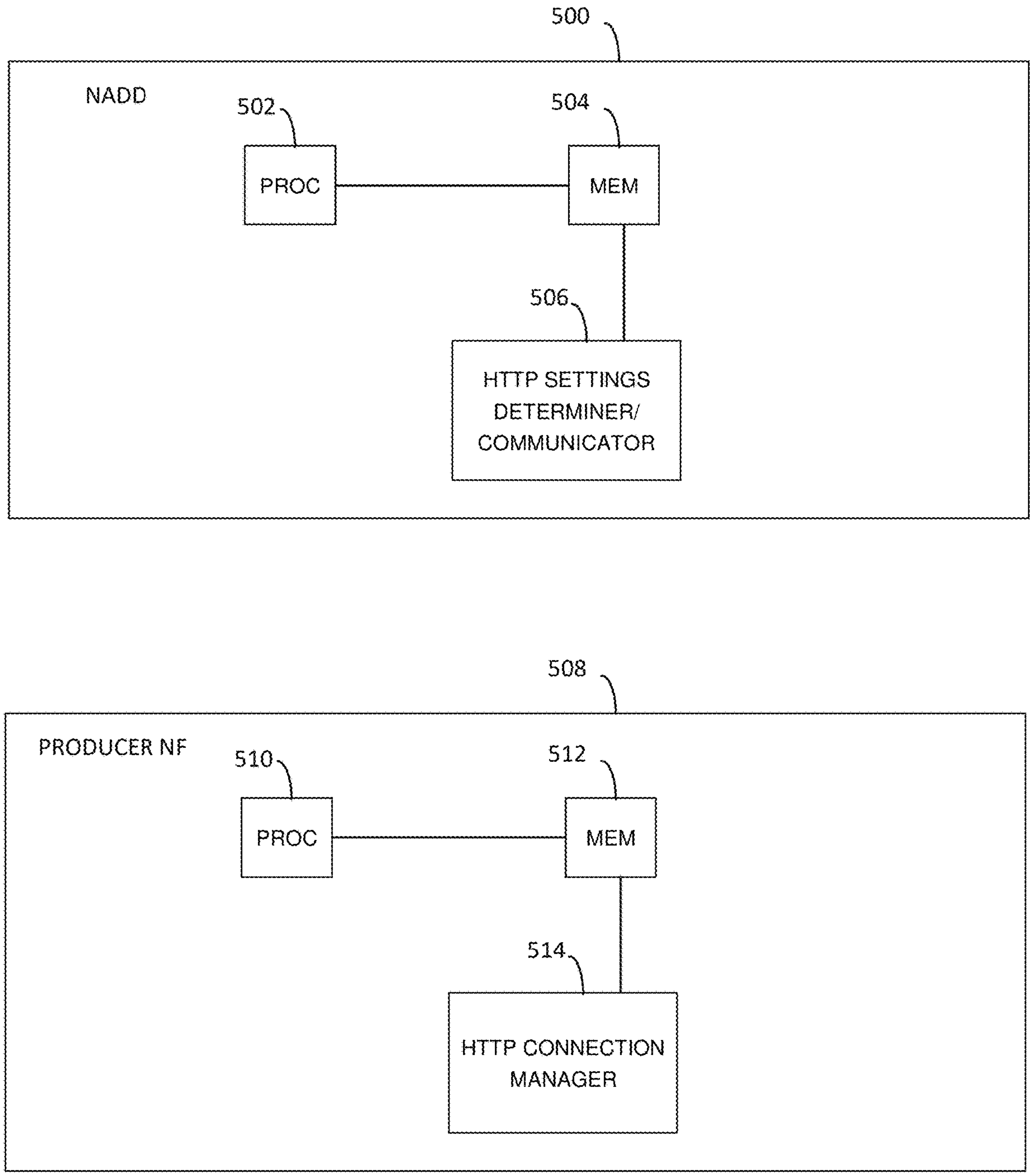
FIG. 7 is a block diagram illustrating exemplary architectures for a producer NF and a NADD for dynamic NADD-assisted configuration of HTTP parameter settings at NFs.

FIG. 7 is a block diagram illustrating exemplary architectures of a producer NF and a NADD for NADD-assisted dynamic configuration of HTTP parameter settings at NFs. Referring to FIG. 7, NADD 500 includes at least one processor 502 and memory 504. NADD 500 further includes an HTTP settings determiner/communicator 506 that receives the SBI message feeds from NFs as illustrated in FIG. 5, determines, from the message feeds, HTTP parameter settings for the NFs, and communicates the HTTP parameter settings to NFs, either in response to subscription requests or in response to query messages. In the example illustrated in FIG. 6, NADD 500 determines an HTTP connection window size setting an communicates the HTTP connection window size setting to a subscribing NF. In another example, NADD 500 may determine and communicate other HTTP parameter settings, such as initial window size, maximum concurrent streams, stream window size and/or other HTTP parameter settings to a subscribing or requesting NF. HTTP settings determiner/communicator 506 may be implemented using computer-executable instructions stored in memory 504 and executed by processor 502.

Producer NF 508 includes at least one processor 510 and memory 512. Producer NF 508 also includes an HTTP connection manager 514 that establishes HTTP connections with other NFs and configurates the parameter settings for the HTTP connections using the settings values received from NADD 500. HTTP connection manager 514 may be implemented using computer-executable instructions stored in memory 512 and executed by processor 510.

Figure 8:
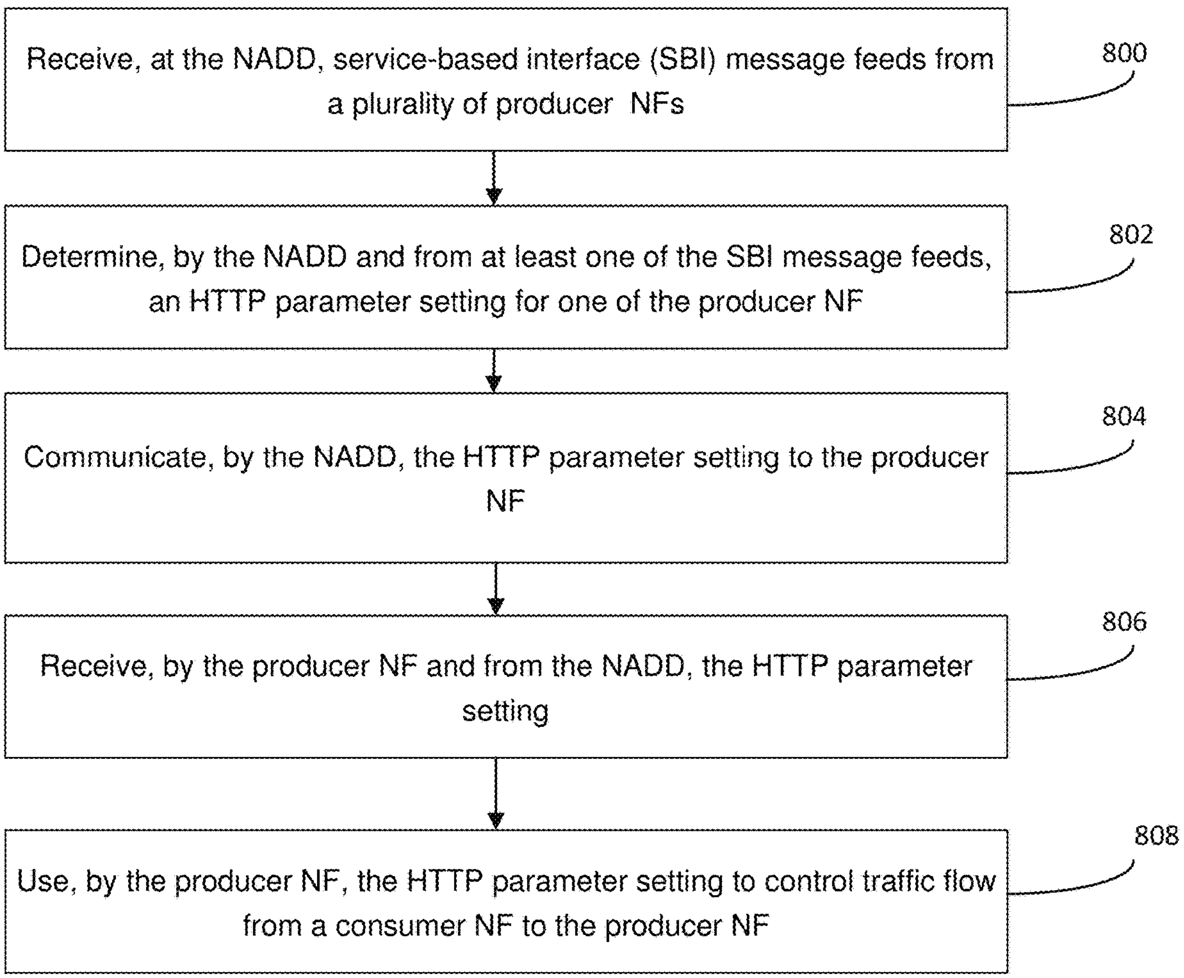
FIG. 8 is a flow chart illustrating an exemplary process for dynamic NADD-assisted configuration of HTTP parameter settings at NFs.

FIG. 8 is a flow chart illustrating an exemplary process for dynamic NADD-assisted dynamic configuration of HTTP parameter settings at NFs. Referring to FIG. 8, in step 800, the process includes receiving, at the NADD, service-based interface (SBI) message feeds from a plurality of producer NFs. For example, NADD 500 may receive message feeds over secure connections from NFs. The message feeds may include copies of SBI request messages transmitted by the NFs and SBI response messages received by the NFs.

In step 802, the process further includes determining, by the NADD and from at least one of the SBI message feeds, an HTTP parameter setting for one of the producer NF. As illustrated by the example in FIG. 6, NADD 500 sets the connection window size for a connection between SCP 101 and PCF 102 to be 75000 bytes instead of the default connection window size of 65535 bytes. NADD 500 may determine that 75000 bytes is appropriate by observing that SCP 101 historically receives SBI messages that need to be transmitted to PCF 102 with an aggregated amount of data totaling more than 65535 bytes before PCF 102 would typically send a WINDOW_UPDATE message to update the connection window size. In FIG. 6, SCP 101 has 70000 byes of data to send to PCF 102. If, from prior message feeds from SCP 101, NADD 500 determines that the average amount of data that SCP 101 needs to transmit to PCF 102 before receiving a WINDOW_UPDATE message to update the connection window size is 70000 bytes, NADD 500 may determine that the default connection window size of 65535 bytes is insufficient to avoid flow control. In such a case, NADD 500 may determine that the appropriate connection window size needs to be the average or median value (in this case 70000 bytes) plus a configurable amount above the average or median value (in this case 5000 bytes) to reduce the likelihood of SCP 101 going into flow control. NADD 500 may determine appropriate HTTP parameter settings per-HTTP-connection and per-NF, so that a subscribing or requesting entity can obtain the appropriate HTTP connection settings for each HTTP connection with each NF.

It should also be noted that NADD 500 may continually and automatically update the HTTP parameter settings based on the message feeds from the NFs. For example, if the HTTP parameter setting is a connection window size value, NADD 500 may continually update the needed connection window size value for a particular HTTP connection as new SBI message copies are received. NADD 500 may automatically communicate the updated HTTP parameter settings to subscribing NFs.

In step 804, the process further includes communicating, by the NADD, the HTTP parameter setting to the producer NF. As indicated above, in one example, an NF can subscribe to receive HTTP settings for an NF from NADD 500. In another example, an NF can query NADD 500 for HTTP settings, and NADD 500 will provide the HTTP settings in response to the query message.

In step 806, the process further includes receiving, by the producer NF and from the NADD, the HTTP parameter setting. For example, a subscribing or querying NF may receive a message from NADD 500 including the requested HTTP settings.

In step 808, the process further includes using, by the producer NF, the HTTP parameter setting to control traffic flow from a consumer NF to the producer NF. For example, the producer NF may, in the case of the connection window size, communicate the connection window size determined by NADD 500 in a WINDOW_UPDATE message. The consumer NF may use the connection window size to determine how much data the consumer NF can send to the producer NF before going into flow control.

Exemplary advantages of the subject matter described herein include a reduced likelihood of SBI service outages due to HTTP parameter setting misconfiguration. Another advantage is a reduction in operational costs of NFs due to automatic configuration of HTTP settings using the NADD. In addition to automatically configuring HTTP settings at NFs, the NADD can provide network analytics around HTTP settings providing insight into network. Yet another advantage of the subject matter described herein is reducing latency in SBI transactions by reducing the need for NFs to go into flow control. Yet another advantage of the subject matter described herein is providing for appropriate utilization of NF resources.

The disclosure of each of the following references is hereby incorporated herein by reference in its entirety.

REFERENCES 1. 3rd Generation Partnership Project; Technical Specification Group Services and System Aspects; System architecture for the 5G System (5GS); Stage 2 (Release 19) 3GPP TS 23.501 V19.0.0 (2024-06)
2. 3rd Generation Partnership Project; Technical Specification Group Services and System Aspects; Procedures for the 5G System (5GS); Stage 2 (Release 18) 3GPP TS 23.502 V18.6.0 (2024-06)
3. 3rd Generation Partnership Project; Technical Specification Group Core Network and Terminals; 5G System; Technical Realization of Service Based Architecture; Stage 3 (Release 18) 3GPP TS 29.500 V18.6.0 (2024-06)
4. 3rd Generation Partnership Project; Technical Specification Group Core Network and Terminals; 5G System; Principles and Guidelines for Services Definition; Stage 3 (Release 18) 3GPP TS 29.501 V18.5.0 (2024-06)
5. Thompson et al., HTTP/2, Internet Engineering Task Force (IETF) Request for Comments (RFC) 9113 (June 2022)
6. 3rd Generation Partnership Project; Technical Specification Group Core Network and Terminals; 5G System; Network Function Repository Services; Stage 3 (Release 18) 3GPP TS 29.510 V18.7.0 (2024-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network analytics data director (NADD)-assisted dynamic configuration of hypertext transfer protocol (HTTP) parameter settings at network functions (NFs), the method comprising:

receiving, at the NADD, service-based interface (SBI) message feeds from a plurality of producer NFs;

determining, by the NADD and from at least one of the SBI message feeds, an HTTP parameter setting for one of the producer NFs;

communicating, by the NADD, the HTTP parameter setting to the producer NF;

receiving, by the producer NF and from the NADD, the HTTP parameter setting; and using, by the producer NF, the HTTP parameter setting to control traffic flow from a consumer NF to the producer NF.

2. The method of claim 1 wherein receiving the SBI message feeds includes receiving copies of SBI messages transmitted and received by the producer NF.

3. The method of claim 1 wherein the HTTP parameter setting comprises an HTTP connection window size value.

4. The method of claim 3 wherein determining the HTTP parameter setting includes determining the HTTP connection window size value based on an analysis of traffic received by the producer NF from the consumer NF to reduce a likelihood of the consumer NF going into flow control.

5. The method of claim 1 comprising receiving, at the NADD and from the producer NF, an HTTP parameter setting subscription request message.

6. The method of claim 5 wherein communicating the HTTP parameter setting to the producer NF includes transmitting the HTTP parameter setting to the producer NF in an HTTP parameter setting subscription response message responsive to the HTTP parameter setting subscription request message.

7. The method of claim 1 wherein communicating the HTTP parameter setting to the producer NF includes communicating the HTTP parameter setting to the producer NF in a response message transmitted to the producer NF in response to a query message received from the producer NF.

8. The method of claim 1 comprising continually and automatically updating, by the NADD and based on the at least one of the SBI message feeds, the HTTP parameter setting.

9. The method of claim 1 wherein using the HTTP parameter setting to control traffic flow from the consumer NF to the producer NF includes communicating the HTTP parameter setting to the consumer NF, and, at the consumer NF, using the HTTP parameter setting to control the traffic flow from the consumer NF to the producer NF.

10. The method of claim 1 wherein the HTTP parameter setting includes one or more of an HTTP maximum concurrent streams value and an HTTP stream window size value.

11. A system for network analytics data director (NADD)-assisted dynamic configuration of hypertext transfer protocol (HTTP) parameter settings at network functions (NFs), the system comprising:

a producer NF including at least one processor and a memory;

and a NADD including at least one processor and a memory for receiving service-based interface (SBI) message feeds from a plurality of producer NFs, including the producer NF, determining, from at least one of the SBI message feeds, an HTTP parameter setting for the producer NF, and communicating the HTTP parameter setting to the producer NF, wherein the producer NF is configured to receive the HTTP parameter setting from the NADD and use the HTTP parameter setting to control traffic flow from a consumer NF to the producer NF.

12. The system of claim 11 wherein the SBI message feeds include copies of SBI messages transmitted and received by the producer NF.

13. The system of claim 11 wherein the HTTP parameter setting comprises an HTTP connection window size value.

14. The system of claim 13 wherein the NADD is configured to determine the HTTP parameter setting by determining the HTTP connection window size value based on an analysis of traffic received by the producer NF from the consumer NF to reduce a likelihood of the consumer NF going into flow control.

15. The system of claim 11 wherein the NADD is configured to receive, from the producer NF, an HTTP parameter setting subscription request message and to communicate the HTTP parameter setting to the producer NF by transmitting the HTTP parameter setting to the producer NF in an HTTP parameter setting subscription response message responsive to the HTTP parameter setting subscription request message.

16. The system of claim 11 wherein the NADD is configured to communicate the HTTP parameter setting to the producer NF by transmitting a response message to the producer NF in response to a query message received from the producer NF.

17. The system of claim 11 wherein the NADD is configured to continually and automatically update the HTTP parameter setting based on the at least one of the SBI message feeds.

18. The system of claim 11 wherein the producer NF is configured to use the HTTP parameter setting to control traffic flow from the consumer NF to the producer NF by communicating the HTTP parameter setting to the consumer NF.

19. The system of claim 11 wherein the HTTP parameter setting includes one or more of an HTTP maximum concurrent streams value and an HTTP stream window size value.

20. One or more non-transitory computer readable media having stored thereon executable instructions that when executed by one or more processors of one or more computers control the one or more computers to perform steps comprising:

receiving, at a network analytics data director (NADD), service-based interface (SBI) message feeds from a plurality of producer network functions (NFs);

determining, by the NADD and from at least one of the SBI message feeds, an HTTP parameter setting for one of the producer NFs;

communicating, by the NADD, the HTTP parameter setting to the producer NF;

receiving, by the producer NF and from the NADD, the HTTP parameter setting; and using, by the producer NF, the HTTP parameter setting to control traffic flow from a consumer NF to the producer NF.

* * * * *